US011911644B2

(12) United States Patent
Monfils et al.

(10) Patent No.: US 11,911,644 B2

(45) **Date of Patent: *Feb. 27, 2024**

(54) FIRE-FIGHTING FOAM CONCENTRATE

(71) Applicant: Tyco Fire Products LP, Lansdale, PA (US)

(72) Inventors: JoAnna M. Monfils, Peshtigo, WI (US); John P. Libal, Peshtigo, WI (US); Robert A. Chaltry, Porterfield, WI (US); Adam L. Monfils, Peshtigo, WI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,663

(22) Filed: Mar. 14, 2022

(65) Prior Publication Data

US 2022/0362603 A1 Nov. 17, 2022

Related U.S. Application Data

(60) Provisional application No. 63/288,026, filed on Dec. 10, 2021, provisional application No. 63/288,024, filed on Dec. 10, 2021, provisional application No. 63/288,020, filed on Dec. 10, 2021, provisional application No. 63/245,028, filed on Sep. 16, 2021, provisional application No. 63/215,006, filed on Jun. 25, 2021, provisional application No. 63/188,633, filed on May 14, 2021.

(51) Int. Cl.

| | |
|---|---|
| ***A62D 1/02*** | (2006.01) |
| ***A62C 99/00*** | (2010.01) |
| ***A62C 5/02*** | (2006.01) |
| ***A62D 1/00*** | (2006.01) |

(52) U.S. Cl.

CPC .............. *A62D 1/0071* (2013.01); *A62C 5/02* (2013.01); *A62C 99/0036* (2013.01); *A62D 1/0042* (2013.01)

(58) Field of Classification Search

None

See application file for complete search history.

(56) References Cited

U.S. PATENT DOCUMENTS

| | | | |
|---|---|---|---|
| 3,956,138 | A | 5/1976 | Crockett |
| 4,060,489 | A | 11/1977 | Chiesa, Jr. |
| 4,398,605 | A | 8/1983 | Conklin et al. |
| 4,410,508 | A | 10/1983 | Brown et al. |
| 5,218,021 | A | 6/1993 | Clark et al. |
| 5,225,095 | A | 7/1993 | Dimaio et al. |
| 5,296,164 | A | 3/1994 | Thach et al. |
| 5,391,721 | A | 2/1995 | Hanen et al. |
| 5,434,192 | A | 7/1995 | Thach et al. |
| 5,496,475 | A | 3/1996 | Jho et al. |
| 5,616,273 | A | 4/1997 | Clark et al. |
| 5,706,895 | A | 1/1998 | Sydansk |
| 5,882,541 | A | 3/1999 | Achtmann |
| 5,997,758 | A | 12/1999 | Barbarin et al. |
| 6,262,128 | B1 | 7/2001 | Stern et al. |
| 6,599,872 | B1 | 7/2003 | Hubert et al. |
| 7,005,082 | B2 | 2/2006 | Clark |
| 7,011,763 | B2 | 3/2006 | Clark |
| 7,135,125 | B2 | 11/2006 | Clark |
| 7,172,709 | B2 | 2/2007 | Clark |
| 7,199,083 | B2 | 4/2007 | Zevallos |
| 7,271,133 | B2 | 9/2007 | Weaver et al. |
| 7,334,640 | B2 | 2/2008 | Hanes et al. |
| 7,381,696 | B2 | 6/2008 | Hubert et al. |
| 7,541,316 | B2 | 6/2009 | Maresh |
| 7,569,155 | B2 | 8/2009 | Schaefer |
| 7,588,645 | B2 | 9/2009 | Griese et al. |
| 7,888,297 | B2 | 2/2011 | Hanes et al. |
| 7,888,308 | B2 | 2/2011 | Swazey |
| 7,994,111 | B2 | 8/2011 | Caggioni et al. |
| 8,043,999 | B2 | 10/2011 | Sullivan et al. |
| 8,076,270 | B2 | 12/2011 | Smith et al. |
| 8,207,094 | B2 | 6/2012 | Hutchins et al. |
| 8,298,436 | B2 | 10/2012 | Michael |
| 8,366,955 | B2 | 2/2013 | Thomas et al. |
| 8,413,721 | B2 | 4/2013 | Welton et al. |
| 8,524,104 | B1 | 9/2013 | Michael |
| 8,703,691 | B2 | 4/2014 | Caggioni et al. |
| 8,772,359 | B2 | 7/2014 | Swazey |
| 8,783,374 | B2 | 7/2014 | Rains et al. |

(Continued)

FOREIGN PATENT DOCUMENTS

| | | | |
|---|---|---|---|
| CN | 1599633 | A | 3/2005 |
| CN | 101198381 | A | 6/2008 |
| CN | 105056458 | A | 11/2015 |
| CN | 112675469 | A | 4/2021 |
| CN | 112694638 | A | 4/2021 |
| WO | WO-2008/058324 | A1 | 5/2008 |
| WO | WO-2011/050980 | A2 | 5/2011 |
| WO | WO-2016/075480 | A1 | 5/2016 |
| WO | WO-2016/082041 | A1 | 6/2016 |
| WO | WO-2018/022763 | A1 | 2/2018 |
| WO | WO-2018/134393 | A1 | 7/2018 |
| WO | WO-2018/234647 | A1 | 12/2018 |
| WO | WO-2019/202045 | A1 | 10/2019 |

(Continued)

OTHER PUBLICATIONS

Derwent-Acc-No. 2020-69248T as Abstract for WO 2020149733 A1 (Jul. 2020).*

Derwent Acc. No. 2020-69248T; Chai, et al.; "Composition with Foaming Properties"; Derwent; Abstract for WO2020/149733A1; dated Jul. 23, 2020; 4 pages.

International Search Report and Written Opinion on PCT Appl. Ser. No. PCT/IB2022/053615 dated Jul. 26, 2022 (13 pages).

(Continued)

*Primary Examiner* — Joseph D Anthony

(74) *Attorney, Agent, or Firm* — Foley & Lardner LLP

(57) ABSTRACT

An aqueous fire-fighting foam concentrate includes a sugar component including a monosaccharide sugar, a sugar alcohol, or a combination thereof; a polysaccharide thickener; a surfactant component selected from an anionic surfactant and a zwitterionic surfactant, a water-miscible organic solvent; and at least about 30 wt. % water.

16 Claims, No Drawings

(56) References Cited

U.S. PATENT DOCUMENTS 9,045,716 B2 6/2015 Swazey et al.
9,259,602 B2 2/2016 Robinet et al.
9,289,636 B2 3/2016 Mathis
9,420,784 B2 8/2016 Vanlaer et al.
9,487,661 B2 11/2016 Johnson et al.
9,662,522 B2 5/2017 Liu et al.
9,669,246 B2 6/2017 Bowen et al.
9,675,828 B1 6/2017 Sery
9,687,686 B2 6/2017 Blunk et al.
9,776,029 B2 10/2017 Izumida et al.
9,956,447 B2 5/2018 Martin et al.
9,956,448 B2 5/2018 Martin
10,030,214 B2 7/2018 Swazey et al.
10,071,273 B2 9/2018 Hansen et al.
10,159,863 B2 12/2018 Mariampillai et al.
10,173,089 B2 1/2019 Xie
10,214,708 B2 2/2019 Swazey et al.
10,328,297 B2 6/2019 Bowen et al.
10,335,624 B2 7/2019 Libal
10,369,394 B2 8/2019 Bowen
10,369,395 B2 8/2019 Bowen et al.
10,443,019 B2 10/2019 Fossum et al.
10,457,900 B2 10/2019 Fossum et al.
10,494,592 B2 12/2019 Applegate et al.
10,518,120 B2 12/2019 Pai et al.
10,625,108 B2 4/2020 Mariampillai et al.
10,653,910 B2 5/2020 Da Costa et al.
10,780,305 B2 9/2020 Xie et al.
10,870,030 B2 12/2020 Libal
10,940,352 B2 3/2021 Worsman
11,065,490 B2 7/2021 Lavergne et al.
11,173,334 B2 11/2021 Xie et al.
2002/0014610 A1* 2/2002 Tanaka ................. A62D 1/0071 252/3
2003/0201419 A1* 10/2003 Tanaka ................. A62D 1/0057 252/3
2004/0006175 A1 1/2004 Diener et al.
2005/0113272 A1 5/2005 Yeung et al.
2007/0256836 A1 11/2007 Welton et al.
2008/0108541 A1 5/2008 Swazey
2008/0196908 A1 8/2008 Schaefer
2011/0097294 A1 4/2011 Anthony et al.
2013/0313465 A1 11/2013 Podella et al.
2014/0138104 A1 5/2014 Robinet et al.
2016/0107015 A1 4/2016 Cheng
2017/0056698 A1* 3/2017 Pai ....................... A62D 1/0042
2017/0259099 A1 9/2017 Blunk et al.
2018/0325141 A1* 11/2018 Nakajima .............. A21D 13/50
2018/0361185 A1 12/2018 Siem
2019/0008187 A1 1/2019 Konda et al.
2019/0262647 A1 8/2019 Havelka-Rivard et al.
2019/0314660 A1 10/2019 Chirac et al.
2020/0094093 A1 3/2020 Worsman et al.
2020/0101340 A1* 4/2020 Worsman ................. A62D 1/00
2020/0139180 A1 5/2020 Lovas
2020/0206552 A1 7/2020 Mariampillai et al.
2020/0215372 A1 7/2020 Lavergne et al.
2020/0368570 A1 11/2020 Hodgen et al.
2021/0009787 A1 1/2021 Hulbert et al.
2021/0046347 A1* 2/2021 LaVergne ............... A62C 31/12
2021/0128431 A1 5/2021 Sartingen et al.
2021/0146182 A1 5/2021 Hugener
2021/0154512 A1 5/2021 Libal
2021/0187337 A1 6/2021 Worsman
2021/0283449 A1 9/2021 Lavergne et al.
2022/0134158 A1 5/2022 Havelka-Rivard et al.
2022/0411644 A1 12/2022 Rhoades et al.

FOREIGN PATENT DOCUMENTS

WO WO-2020/033255 A1 2/2020
WO WO-2020/084277 A1 4/2020
WO WO-2020/109654 A1 6/2020
WO WO-2020/144579 A1 7/2020
WO WO-2020/149733 A1 7/2020
WO WO 2020149733 A1 * 7/2020 ............. C09K 8/594
WO WO-2020/217126 A1 10/2020
WO WO-2020/247780 A1 12/2020
WO WO-2021/099308 A1 5/2021
WO WO-2022/094399 5/2022

OTHER PUBLICATIONS

International Search Report and Written Opinion on PCT Appl. Ser. No. PCT/IB2022/053619 dated Jul. 29, 2022 (14 pages).
International Search Report and Written Opinion on PCT Appl. Ser. No. PCT/IB2022/053620 dated Jul. 29, 2022 (14 pages).
International Search Report and Written Opinion on PCT Appl. Ser. No. PCT/IB2022/053621 dated Jul. 29, 2022 (15 pages).
International Search Report and Written Opinion on PCT Appl. Ser. No. PCT/IB2022/053618 dated Jul. 22, 2022 (13 pages).

* cited by examiner

FIRE-FIGHTING FOAM CONCENTRATE

CROSS-REFERENCE TO RELATED APPLICATIONS

This application claims the benefit of priority to U.S. Provisional Patent Application Nos. 63/188,633, filed on May 14, 2021; 63/215,006, filed on Jun. 25, 2021; 63/245,028, filed Sep. 16, 2021; 63/288,024, filed on Dec. 10, 2021; 63/288,020, filed on Dec. 10, 2021; and 63/288,026, filed on Dec. 10, 2021 the contents of which are incorporated herein by reference in their entirety.

BACKGROUND

Firefighting foams are often able to fight Class A and Class B fires. Class A fires are those involving combustible material such as paper, wood, etc. and can be fought by quenching and cooling with large quantities of water or solutions containing water. Class B fires are those involving flammable liquid fuels, gasoline, and other hydrocarbons and are difficult to extinguish. Most flammable liquids exhibit high vapor pressure along with low fire and flash points. This typically results in a wide flammability range. In this type of fire, the use of water as the sole firefighting agent is generally ineffective because the only means of fighting fire with water is through cooling.

Conventional foam-forming firefighting compositions commonly include fluorinated surfactants. There is a strong desire in the marketplace to replace these fluorinated firefighting products with non-fluorinated products. There is therefore a continuing need to produce non-fluorinated firefighting compositions, also known as synthetic fluorine-free foams or SFFF that can be deployed to fight Class A and Class B fires.

SUMMARY

The present application is directed to aqueous concentrates, which can be diluted with an aqueous diluent to provide a foam precursor composition, which may be aerated to form a firefighting foam. The present aqueous firefighting compositions include a sugar component, a polysaccharide thickener and a surfactant component containing one or more of an anionic surfactant, a zwitterionic surfactant, and optionally a nonionic surfactant. The aqueous firefighting compositions may also include an organic solvent, e.g., a water-miscible organic solvent such as an alkylene glycol, glycerol, a water-soluble polyethylene glycol, and/or a glycol ether. The composition may be substantially free of any fluorinated compounds, e.g., contain no more than 70 parts per trillion (ppt) fluorinated surfactant(s) and, often, is completely free of any fluorinated surfactant or other fluorinated compounds. In some embodiments, the firefighting composition is free of nonionic surfactant.

An illustrative embodiment provides an aqueous firefighting foam concentrate including a sugar component, which includes a monosaccharide sugar and/or sugar alcohol; a surfactant mixture containing one or more of an aliphatic alcohol-based nonionic surfactant, an alkyl sulfate anionic surfactant, alkyl sulfonate anionic surfactant, and a zwitterionic surfactant; an organic solvent, such as a glycol, glycerol and/or a glycol ether; and a polysaccharide thickener. An aqueous firefighting foam precursor can be formed by diluting the concentrate with a much larger volume of an aqueous diluent, e.g., municipal water and/or salt water. The resulting firefighting foam precursor can then be aerated to provide a firefighting foam. In some embodiments, the firefighting composition is free of nonionic surfactant.

In an illustrative embodiment, the aqueous firefighting foam composition is a concentrate which includes a) a sugar component, which includes a monosaccharide sugar and/or sugar alcohol; b) a nonionic surfactant, such as an aliphatic alcohol, c) an anionic surfactant, d) a zwitterionic surfactant, such as an alkylamidopropyl hydroxysultaine surfactant, an alkylamidoalkyl betaine surfactant, an alkyl sulfobetaine surfactant, and/or an alkyl betaine surfactant, e) an organic solvent, which includes one or more of a glycol, glycerol, a glycol ether or a water-soluble polyethylene glycol, f) a polysaccharide thickener and g) at least about 30 wt. % water. The composition generally contains no more than 70 ppt of a fluorinated surfactant and, often, is completely free of any fluorinated surfactant or other fluorinated compounds.

Another illustrative embodiment provides an aqueous firefighting foam concentrate including a) at least about 10 wt. % of a sugar component, which comprises at least about 50 wt. % glucose and fructose; b) polysaccharide thickener; c) a surfactant component, which comprises anionic surfactant, zwitterionic surfactant and an aliphatic alcohol-based nonionic surfactant; d) organic solvent comprising one or more of a glycol, glycol ether, glycerol and/or water-soluble polyethylene glycol (PEG); and e) at least about 30 wt. % water.

Another illustrative embodiment provides an aqueous firefighting foam concentrate including a) a sugar component, which includes a monosaccharide sugar and/or sugar alcohol; b) an octyl sulfate salt and/or decyl sulfate salt and/or lauryl sulfate salt, c) an alkyl hydroxysultaine surfactant and/or alkylamidopropyl hydroxysultaine surfactant, d) diutan gum and xanthan gum, e) a mixture of ethylene glycol and butyl carbitol; f) an aliphatic alcohol-based nonionic surfactant, such as an aliphatic alcohol and/or aliphatic alcohol ethoxylate and g) at least about 30 wt. % water. The composition generally contains no more than 70 ppt fluorinated surfactant and, often, is completely free of any fluorinated surfactant or other fluorinated compounds.

Another illustrative embodiment provides an aqueous firefighting foam concentrate including a) a sugar component, which comprises monosaccharide sugar (e.g., glucose and/or fructose) and/or sugar alcohol (e.g., sorbitol, mannitol and/or xylitol); b) a polysaccharide thickener; c) an aliphatic alcohol-based nonionic surfactant, such as a $C_{8-14}$-aliphatic alcohol and/or a $C_{10-16}$-aliphatic alcohol ethoxylate; d) an additional surfactant component, which comprises anionic surfactant and/or zwitterionic surfactant; e) water-miscible organic solvent; and f) water. The concentrate generally contains no more than 70 ppt fluorinated surfactant and, often, is completely free of any fluorinated surfactant or other fluorinated compounds.

Another illustrative embodiment provides an aqueous firefighting foam concentrate including a) a sugar component, which includes a monosaccharide sugar and/or sugar alcohol; b) an octyl sulfate salt and/or decyl sulfate salt and/or lauryl sulfate salt, c) an alkyl hydroxysultaine surfactant and/or alkylamidopropyl hydroxysultaine surfactant, d) welan gum and xanthan gum, e) a mixture of ethylene glycol and butyl carbitol; f) an aliphatic alcohol-based nonionic surfactant, such as an aliphatic alcohol and/or aliphatic alcohol ethoxylate and g) at least about 30 wt. % water. The composition generally contains no more than 70 ppt fluorinated surfactant and, often, is completely free of any fluorinated surfactant or other fluorinated compounds.

Another illustrative embodiment provides an aqueous firefighting foam concentrate including a) a sugar component, which includes a monosaccharide sugar and/or sugar alcohol; b) an octyl sulfate salt and/or decyl sulfate salt and/or lauryl sulfate salt, c) an alkyl hydroxysultaine surfactant and/or alkylamidopropyl hydroxysultaine surfactant, d) xanthan gum and succinoglycan, e) a mixture of ethylene glycol and butyl carbitol; f) an aliphatic alcohol-based nonionic surfactant, such as an aliphatic alcohol and/or aliphatic alcohol ethoxylate and g) at least about 30 wt. % water. The composition generally contains no more than 70 ppt fluorinated surfactant. In some embodiments, the composition is completely free of any fluorinated surfactant or other fluorinated compounds.

Another illustrative embodiment provides an aqueous firefighting foam concentrate including a) $C_{8-12}$-fatty alcohol, b) $C_{8-12}$-alkylsulfate, c) alkylamidoalkyl hydroxysultaine, d) one or more polysaccharide thickeners, f) a mixture of an alkylene glycol and a glycol ether, such a butyl carbitol; g) a sugar component, which comprises monosaccharide sugar (e.g., glucose and/or fructose) and/or sugar alcohol; and h) at least about 30 wt. %, more often at least about 50 wt. % water. Such concentrates commonly include about 5 to 40 wt. % and more typically about 10 to 20 wt. % of the sugar component. The combined amount of alkylene glycol and glycol ether may commonly be about 2 to 20 wt. % of the concentrate. In some instances, the aqueous firefighting foam concentrate includes about 2 to 20 wt. % of the organic solvent. In some embodiments, the aqueous firefighting foam composition includes about 0.1 to 5 wt. % and, more commonly, about 0.5 to 3 wt. % of the polysaccharide thickener, which may include a mixture of xanthan gum and diutan gum, a mixture of xanthan gum and succinoglycan, or a mixture of xanthan gum and welan gum. The composition generally contains no more than 70 ppt of the fluorinated surfactant and, often, is completely free of any fluorinated surfactant or other fluorinated compounds.

DETAILED DESCRIPTION

In one aspect, the aqueous firefighting foam compositions of the present disclosure include a sugar component, which includes a monosaccharide sugar and/or sugar alcohol; polysaccharide thickener; a surfactant component, which comprises anionic surfactant, zwitterionic surfactant and/or an aliphatic alcohol-based nonionic surfactant; a water-miscible organic solvent; and at least about 30 wt. % water. In some embodiments, the firefighting foam composition is free of nonionic surfactant.

Saccharides for use in the present aqueous fire-fighting foam concentrates are generally simple monosaccharide sugars and may include other carbohydrates, such as common sugar (sucrose/dextrose) derived from sugar cane or sugar beets. Sucrose is a disaccharide composed from the basic, simple sugar molecules glucose and fructose. Mixtures where the majority of the sucrose has been broken down into its monosaccharide components, glucose and fructose (e.g., invert sugar), are quite suitable for use in the present concentrates. Sucrose is readily available in view of its world production from cane and sugar beet on the order of millions of tons per annum. Those skilled in the art will also be aware that other commercially available simple monosaccharides and related sugar alcohols can be utilized in the present foam concentrates. Examples of suitable monosaccharides for use in the present foam concentrates include one or more of glucose, fructose, mannose, xylose and galactose. Examples of suitable sugar alcohols for use in the present foam concentrates include one or more of a four carbon sugar alcohol, such as erythritol, a five carbon alditol, such as xylitol, a six carbon alditol, such as mannitol and/or sorbitol, and other sugar alcohols, such as isomalt. Commonly, the sugar alcohol is one derived from a monosaccharide.

The present aqueous fire-fighting foam concentrates generally include a sugar component comprising at least about 50 wt. % of one or more monosaccharide sugars and/or sugar alcohols. Suitable examples include a sugar component containing one or more of glucose, fructose, mannose, xylose, sorbitol, xylitol and mannitol. The foam concentrate commonly includes about 5 to 25 wt. % and, more commonly about 10 to 20 wt. % of the sugar component. In some instances, the foam concentrate may include as much as about 45 wt. % or even 50 wt. % of the sugar component. In some embodiments, the sugar component comprises at least about 75 wt. %, at least about 80 wt. %, or even at least about 90 wt. % monosaccharide sugar and/or sugar alcohol. For example, the sugar component may comprise at least about 50 wt. %, at least about 75 wt. %, at least about 80 wt. %, or even at least about 90 wt. % of one or more of glucose, fructose, mannose, xylitol, sorbitol and mannitol. In some embodiments, the foam concentrate may include a sugar component, which comprises at least about 50 wt. % of one or more sugar alcohols, such as xylitol, sorbitol and mannitol. The sugar component may include at least about 50 wt. %, at least about 75 wt. %, at least about 80 wt. %, or even at least about 90 wt. % of one or more of glucose, fructose and sorbitol. For example, the sugar component may include at least about 50 wt. % and, more commonly, at least about 75 wt. % glucose and/or fructose.

The concentrate may include an aliphatic alcohol-based nonionic surfactant, such as an aliphatic alcohol and/or an aliphatic alcohol ethoxylate. For example, the concentrate may include an aliphatic alcohol-based nonionic surfactant including an aliphatic alcohol having 8 to 14 carbon atoms and/or an aliphatic alcohol ethoxylate having 10 to 16 carbon atoms in its alcohol portion. The foam concentrate may suitably include about 0.1 to 5 wt. %, commonly, about 0.5 to 3 wt. % and, more commonly, about 0.5 to 2 wt. % of the aliphatic alcohol-based nonionic surfactant. The aliphatic alcohol ethoxylate commonly has an average degree of polymerization (i.e., the average number of ethylene oxide units) of about 0.7-2.0 and often of no more than about 1.5, no more than about 1.2, or no more than about 1.0. Aliphatic alcohols, which include a linear $C_{8-14}$-aliphatic alcohol, such as a $C_{8-14}$-fatty alcohol, are suitable for use as a nonionic surfactant in the present concentrates. Suitable examples of such alcohols include one or more of octyl alcohol, decyl alcohol, lauryl alcohol and myristyl alcohol. The foam concentrate may include an aliphatic alcohol ethoxylate having an average of no more than about 2 ethylene oxide units. The aliphatic alcohol portion of such ethoxylates typically has about 10 to 16 carbon atoms. Suitable examples include decyl alcohol ethoxylates, lauryl alcohol ethoxylates and/or myristyl alcohol ethoxylates. Such ethoxylates commonly have an average of no more than about 2 ethylene oxide units, no more than about 1.5 ethylene oxide units, no more than about 1.2 ethylene oxide units and, in some instances, no more than about 1 ethylene oxide units. In one suitable embodiment, the aliphatic alcohol ethoxylate comprises an ethoxylate of a linear $C_{8-14}$-aliphatic alcohol having no more than about 1.2 ethylene oxide units.

The present aqueous fire-fighting foam concentrates typically include an anionic surfactant. The anionic surfactant may suitably include an alkyl sulfate surfactant, an alkyl sulfonate surfactant, alkyl ether sulfate surfactant, and/or an alkyl ether sulfonate surfactant. The anionic surfactant typically includes an alkyl sulfate surfactant and/or an alkyl sulfonate surfactant. The alkyl sulfate salt surfactant typically includes include a $C_{8-12}$-alkyl sulfate salt. Suitable examples of the $C_{8-12}$-alkyl sulfate salt include a dodecyl sulfate salt, a decyl sulfate salt, an octyl sulfate salt, or a combination of any two or more thereof. In some embodiments, the alkyl sulfate salt includes an alkyl sulfate sodium salt, such as a sodium decyl sulfate, sodium octyl sulfate, or a combination thereof. In some embodiments, the alkyl sulfate salt includes an alkyl sulfate ammonium salt, such as an ammonium decyl sulfate, ammonium octyl sulfate, ammonium lauryl sulfate, or a combination thereof. In embodiments that include the anionic surfactant, the aqueous firefighting foam concentrate may include about 1 to 25 wt. % or about 1 to 20 wt. % of the anionic surfactant. Typically, the aqueous firefighting foam concentrate commonly includes about 2 to 15 wt. %, about 2 to 10 wt. % and, in some instances, about 3 to 10 wt. % of a the anionic surfactant.

In some embodiments, the aqueous fire-fighting foam concentrate may include an anionic surfactant comprises a $C_{8-14}$-alkyl sulfate salt and/or a $C_{8-14}$-alkyl sulfonate salt. In some embodiments, the aqueous fire-fighting foam concentrate may include an anionic surfactant, which comprises one or more surfactants selected from $C_{8-12}$-alkyl sulfate salts and/or a $C_{8-12}$-alkyl sulfonate salts. For example, one or more of octyl sulfate salts, decyl sulfate salts, dodecyl sulfate salts and tetradecyl sulfate salts may be suitable for use as anionic surfactants in the present foam concentrate. The anionic surfactant may suitably be a sodium, potassium and/or ammonium salt.

The present aqueous fire-fighting foam concentrates typically include a zwitterionic surfactant. The zwitterionic surfactant typically includes one or more of an alkylamidoalkyl betaine surfactant, an alkyl betaine surfactant, an alkyl sulfobetaine surfactant and an alkylamidoalkylene hydroxysultaine surfactant, such as an alkylamidopropyl hydroxysultaine surfactant. For example, the foam concentrate may include a zwitterionic surfactant, which comprises one or more of a $C_{8-18}$-alkylamidopropyl hydroxysultaine surfactant, a $C_{8-18}$-alkylamidopropyl betaine surfactant a $C_{8-18}$-alkyl sulfobetaine surfactant and a $C_{8-18}$-alkyl betaine surfactant. Suitable examples of the alkylamidoalkylene hydroxysultaine surfactant include a $C_{8-18}$-alkylamidopropyl hydroxysultaine surfactant, such as a cocamidopropyl hydroxysultaine surfactant, which includes a laurylamidopropyl hydroxysultaine and a myristylamidopropyl hydroxysultaine. Suitable examples of the alkylamidoalkyl betaine surfactant include a $C_{8-18}$-alkylamidoalkyl betaine surfactant, such as a cocamidopropyl betaine, a tallowamidopropyl betaine, a laurylamidopropyl betaine or a myristylamidopropyl betaine. In some embodiments, the zwitterionic surfactant includes a $C_{8-14}$-alkylamidopropyl hydroxysultaine, such as a cocamidopropyl hydroxysultaine. In some embodiments, the zwitterionic surfactant includes laurylamidopropyl hydroxysultaine and/or myristylamidopropyl hydroxysultaine. In embodiments that include the zwitterionic surfactant, the aqueous firefighting foam concentrate commonly includes about 1 to 15 wt. % and often about 1 to 10 wt. % of the zwitterionic surfactant. In certain embodiments, the aqueous firefighting foam concentrate may include about 1 to 6 wt. % and, more commonly, about 2 to 5 wt. % of the zwitterionic surfactant.

The present aqueous fire-fighting foam concentrates typically include a water-miscible solvent, which may suitably include one or more of a glycol, a glycol ether, glycerol and a water-soluble polyethylene glycol. Examples of suitable organic solvents include diethylene glycol n-butyl ether, dipropylene glycol n-propyl ether, hexylene glycol, ethylene glycol, propylene glycol, diethylene glycol, dipropylene glycol, tripropylene glycol, dipropylene glycol monobutyl ether, dipropylene glycol monomethyl ether, diethylene glycol monobutyl ether ("butyl carbitol"), ethylene glycol monobutyl ether, tripropylene glycol monomethyl ether, dipropylene glycol monoethyl ether, glycerol, and mixtures of two or more thereof. Quite commonly, the organic solvent includes a mixture of an alkylene glycol and a glycol ether, such as a glycol butyl ether. In some embodiments, the organic solvent includes an alkylene glycol ether, such as ethylene glycol monoalkyl ether, propylene glycol monoalkyl ether, dipropylene glycol monoalkyl ether (e.g., and/or diethylene glycol monoalkyl ether (e.g., butyl carbitol). In some embodiments, the organic solvent includes an alkylene glycol, such as ethylene glycol, propylene glycol, dipropylene glycol and/or diethylene glycol. Quite commonly, the organic solvent may include a mixture of butyl carbitol and a glycol ether, such as ethylene glycol and/or propylene glycol. For example, the organic solvent can include ethylene glycol and butyl carbitol. In another suitable example, the organic solvent includes propylene glycol and butyl carbitol.

The foam concentrate may suitably include about 1 to 50 wt. %, commonly, about 1 to 25 wt. %, often about 1 to 15 wt. % and, more commonly, about 2 to 10 wt. % of the organic solvent. In many embodiments, the aqueous firefighting foam concentrate includes an organic solvent including one or more of an alkylene glycol, glycerol and a glycol ether. The alkylene glycol typically includes propylene glycol and/or ethylene glycol. The glycol ether typically includes ethylene glycol monoalkyl ether, diethylene glycol monoalkyl ether, dipropylene glycol monoalkyl ether, triethylene glycol monoalkyl ether and 1-butoxyethoxy-2-propanol. In some embodiments, the organic solvent may be a mixture of alkylene glycol and glycol ether. In some embodiments, the organic solvent may be a mixture of propylene glycol and alkyl carbitol. In such embodiments, the organic solvent commonly includes the alkylene glycol and alkyl carbitol in a weight ratio of about 0.1:1 to 10:1 or about 0.2:1 to 5:1. In some embodiments, the organic solvent may be a mixture of propylene glycol and butyl carbitol. In some embodiments, the organic solvent may include about 1 to 15 wt. % and often about 1 to 10 wt. % alkylene glycol, such as ethylene glycol, together with about 1 to 15 wt. % and often about 1 to 10 wt. % of a glycol ether, such as butyl carbitol.

The aqueous firefighting foam composition includes a thickener, such as a polysaccharide thickener. The polysaccharide thickener may include a polysaccharide that is soluble in the aqueous firefighting foam concentrate and a second polysaccharide that is less soluble or insoluble in the aqueous firefighting foam concentrate. In some embodiments, the second polysaccharide may be at least partially insoluble (and dispersed) in the aqueous firefighting concentrate, but may be soluble in water alone or in solutions where the concentrate has been diluted with a much larger volume of water. In other embodiments, the concentrate may only include one or more polysaccharides that are completely soluble in the concentrate. The foam concentrate typically includes about 0.1 to 5 wt. %, about 0.2 to 3 wt. %, about 0.5 to 3 wt. % and, more commonly, about 0.5 to 2 wt. % of the polysaccharide thickener.

Examples of suitable polysaccharide thickeners which may be used in the present foam concentrates include agar, sodium alginate, carrageenan, gum arabic, gum guaicum, neem gum, pistacia lentiscus, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, succinoglycan, mastic gum, spruce gum, tara gum, gellan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, and a mixture of two or more thereof.

In some embodiments, the polysaccharide thickener may include one or more of xanthan gum, diutan gum, rhamsan gum, welan gum, gellan gum, guar gum, konjac gum, tara gum, succinoglycan, and methylcellulose. In some embodiments, it may to include a mixture of xanthan gum and one or more of diutan gum, rhamsan gum, welan gum, gellan gum, guar gum, konjac gum, tara gum, succinoglycan, and methylcellulose. In other embodiments, the foam concentrate may include a mixture of xanthan gum and one or more of diutan gum, rhamsan gum, welan gum, succinoglycan, and gellan gum as the polysaccharide thickener. In other embodiments, the foam concentrate may include a mixture of xanthan gum and diutan gum and/or rhamsan gum. In other embodiments, the foam concentrate may include a mixture of xanthan gum and succinoglycan. In other embodiments, the foam concentrate may include a mixture of xanthan gum and welan gum. In other embodiments, the foam concentrate may include welan gum.

Polysaccharide thickeners, which include a combination of xanthan gum and diutan gum, may be particularly suitable for use in the present foam concentrates. For examples, the foam concentrate may include about 0.2 to 3 wt. %, about 0.3 to 2 wt. %, about 0.5 to 1.5 wt. % and even, about 0.5 to 1 wt. % xanthan gum. Such foam concentrates may also include about 0.1 to 2 wt. %, about 0.2 to 1.5 wt. %, or even, about 0.2 to 1 wt. % diutan gum.

In other instances, polysaccharide thickeners, which include a combination of xanthan gum and welan gum, may be particularly suitable for use in the present foam concentrates. For examples, the foam concentrate may include about 0.2 to 3 wt. %, about 0.3 to 2 wt. %, about 0.5 to 1.5 wt. % and even, about 0.5 to 1 wt. % xanthan gum. Such foam concentrates may also include about 0.1 to 5 wt. %, about 0.2 to 4 wt. %, or even, about 0.5 to 3 wt. % welan gum.

In other instances, polysaccharide thickeners, which include a combination of xanthan gum and succinoglycan, may be particularly suitable for use in the present foam concentrates. For examples, the foam concentrate may include about 0.2 to 3 wt. %, about 0.3 to 2 wt. %, about 0.5 to 1.5 wt. % and even, about 0.5 to 1 wt. % xanthan gum. Such foam concentrates may also include about 0.1 to 5 wt. %, about 0.2 to 4 wt. %, or even, about 0.5 to 3 wt. % succinoglycan.

As discussed above, the aqueous firefighting foam concentrate includes water. In some embodiments, the water is water from a municipal water source (e.g., tap water). In some embodiments, the water is a purified water, such as purified water that meets the standards set forth in the United States Pharmacopeia, which is incorporated by reference herein in relevant part. In some embodiments, the aqueous firefighting foam composition includes at least about 30 wt. % water, often at least about 40 wt. % water and, more commonly, at least about 50 wt. % water. In some embodiments, the aqueous firefighting foam concentrate includes greater than about 60 wt. % water. In some embodiments, the aqueous firefighting foam composition may be produced using a source of water that has a total concentration of fluorine atoms on a weight percentage basis of no more than about 1 ppm F.

The aqueous firefighting foam compositions of the present disclosure are commonly substantially free of any fluorinated compounds. As used herein, the "phrase substantially free of fluorinated compounds" means that the aqueous firefighting foam composition includes no more than 0.01 wt. % of fluorinated compounds. In some embodiments, the aqueous firefighting foam composition includes no more than 0.005 wt. % of fluorinated compounds. The aqueous firefighting foam compositions of the present disclosure are substantially free of fluorine. As used herein, the phrase "substantially free of fluorine" means that the composition has a total concentration of fluorine atoms on a weight percentage basis of no more than about 70 parts per trillion (ppt) F. The aqueous firefighting foam compositions of the present disclosure may include substantially less than 70 ppt F.

In some embodiments, the aqueous firefighting foam composition includes one or more chelators or sequestering buffers. Illustrative and non-limiting chelators and sequestering buffers include agents that sequester and chelate metal ions, including polyamminopolycarboxylic acids, ethylenediaminetetraacetic acid, citric acid, tartaric acid, nitrilotriacetic acid, hydroxyethylethylenediaminetriacetic acid and salts thereof. Illustrative buffers include Sorensen's phosphate or McIlvaine's citrate buffers.

In some embodiments, the aqueous firefighting foam composition includes one or more corrosion inhibitors. Illustrative and non-limiting corrosion inhibitors includes ortho-phenylphenol, tolyltriazole, and phosphate ester acids. In some embodiments, the corrosion inhibitor is tolyltriazole.

In some embodiments, the aqueous firefighting foam concentrate may also include a metallic salt, typically a metallic salt, which includes a multi-valent cation. For example, suitable salts may include a cation selected from the group consisting of aluminum, calcium, copper, iron, magnesium, potassium, and calcium cations. The counteranion may suitably be a sulfate and/or phosphate anion. In one embodiment, the metallic salt may include magnesium sulfate.

In some embodiments, the aqueous firefighting foam concentration may include a reducing agent. Accordingly, an aqueous fire-fighting foam concentrate may include a sugar component including a monosaccharide sugar, a sugar alcohol, or a combination thereof, and a reducing agent. The aqueous fire-fighting foam concentration may further include a polysaccharide thickener, a surfactant component including an anionic surfactant, a zwitterionic surfactant, and an aliphatic alcohol-based nonionic surfactant, a water-miscible organic solvent, and at least about 30 wt. % water. When present, the reducing agent may be present in the foam concentration from about 0.01 wt % to about 5 wt %. This may include from about 0.01 wt % to about 3 wt %, from about 0.05 wt % to about 5 wt %, from about 1 wt % to about 5 wt %, or from about 1 wt % to about 3 wt %.

The reducing agent may be selected such that it is more readily oxidized compared to other components of the foam. For example, the reducing agent may be oxidized more readily than the sugar component or polysaccharide components. Illustrative reducing agents include, but are not limited to, sodium sulfite, sodium bisulfite, sodium metabisulfite, or a mixture of any two or more thereof.

In some embodiments, the aqueous firefighting foam concentrate may also include a preservative, such as one or more antimicrobial compounds and/or biocidal compounds. These components are included to prevent the biological decomposition of natural product based polymers that are incorporated as polymeric film formers (e.g., a polysaccharide gum). Examples include Kathon CG/ICP (Rohm & Haas Company), Givgard G-4 40 (Givaudan, Inc.), Dowicil 75 and Dowacide A (Dow Chemical Company).

Tables 1 and 2 below provide an illustration of suitable formulations of the present firefighting foam compositions designed to be combined with a diluent, aerated, and administered to fight a fire as a firefighting foam.

TABLE 1

| Ingredient | Amount (wt. %) |
|---|---|
| Biocide | 0-1.0 |
| Corrosion Inhibitor | 0-0.1 |
| Sugar Component | 5-40 |
| Zwitterionic Surfactant | 1-10 |
| Aliphatic alcohol-based Nonionic Surfactant | 0.2-5 |
| Anionic Surfactant | 2-20 |
| Organic Solvent | 1-20 |
| Polysaccharide Gum | 0.1-5 |
| Water | 30-85 |

TABLE 2

| Ingredient | Amount (wt. %) |
|---|---|
| Biocide | 0-1.0 |
| Corrosion Inhibitor | 0-0.1 |
| Sugar Component | 5-25 |
| Zwitterionic Surfactant | 1-5 |
| Aliphatic alcohol-based Nonionic Surfactant | 0.2-5 |
| Anionic Surfactant | 2-10 |
| Organic Solvent | 2-10 |
| Polysaccharide Gum | 0.2-3 |
| Water | 30-85 |

The present aqueous firefighting compositions may be substantially free of any fluorinated compounds. As used herein, the "phrase substantially free of fluorinated compounds" means that the aqueous firefighting composition includes no more than 0.1 wt. % fluorinated compounds. In some embodiments, the aqueous firefighting composition includes no more than 0.01 wt. % and, in some instances, no more than about 0.005 wt. % fluorinated compounds. The aqueous firefighting compositions of the present disclosure may be substantially free of fluorine in any form. As used herein, the phrase "substantially free of fluorine" means that the aqueous firefighting composition has a total concentration of fluorine atoms on a weight percentage basis of no more than about 1 ppm F.

EXAMPLES

The following examples more specifically illustrate formulations for preparing aqueous firefighting compositions according to various embodiments described above. These examples should in no way be construed as limiting the scope of the present technology.

Example 1

Tables 3-6 below show the composition of a number of illustrative formulations of the present aqueous firefighting foam composition. The amounts shown in these tables represent the weight percentage of the particular component based on the total weight of the composition. The formulations include a) a surfactant mixture including a nonionic surfactant, an anionic surfactant, and a zwitterionic surfactant, b) a siloxane-based surfactant, c) organic solvent comprising one or more of an alkylene glycol, glycerol and a glycol ether, d) at least about 60 wt. % water; e) a polysaccharide thickener.

TABLE 3

| Ingredient | Amount (wt. %) |
|---|---|
| Biocide | 0-0.2 |
| Corrosion inhibitor | 0-0.1 |
| Water | 30-80 |
| Zwitterionic surfactant | 1-15 |
| $C_{8-14}$-Fatty alcohol | 0-5 |
| $C_{8-14}$-Alkyl sulfate surfactant | 2-15 |
| Polysaccharide gum | 0.5-5 |
| Alkylene glycol | 1-15 |
| Alkyl carbitol | 1-15 |
| Total Organic Solvent | 1-20 |
| Monosaccharide sugar(s) | 5-25 |
| Total sugar/sugar alcohol component | 5-30 |

TABLE 4

| Ingredient | Amount (wt. %) |
|---|---|
| Biocide | 0-0.2 |
| Corrosion Inhibitor | 0-0.1 |
| Water | 50-80 |
| Cocamidoalkyl hydroxysultaine | 1-6 |
| $C_{8-12}$-Fatty Alcohol | 0-3 |
| $C_{8-12}$-Alkylsulfate | 3-10 |
| Diutan Gum | 0.1-3 |
| Xanthan Gum | 0.2-2 |
| Ethylene Glycol and/or Propylene Glycol | 1-10 |
| Butyl Carbitol | 1-10 |
| Monosaccharide sugar(s) | 5-25 |
| Total sugar/sugar alcohol component | 5-30 |

TABLE 5

| Ingredient | Amount (wt. %) |
|---|---|
| Biocide | 0-0.2 |
| Corrosion Inhibitor | 0-0.1 |
| Water | 50-80 |
| Cocamidoalkyl hydroxysultaine | 1-7 |
| $C_{8-12}$-Fatty Alcohol | 0-3 |
| $C_{8-12}$-Alkylsulfate | 3-10 |
| Welan Gum | 0.1-4 |
| Xanthan Gum | 0.2-2 |
| Ethylene Glycol and/or Propylene Glycol | 1-10 |
| Butyl Carbitol | 1-10 |
| Monosaccharide sugar(s) | 5-25 |
| Total sugar/sugar alcohol component | 5-30 |

TABLE 6

| Ingredient | Amount (wt. %) |
|---|---|
| Biocide | 0-0.2 |
| Corrosion Inhibitor | 0-0.1 |
| Water | 50-80 |
| Cocamidoalkyl hydroxysultaine | 1-7 |
| $C_{8-12}$-Fatty Alcohol | 0-3 |
| $C_{8-12}$-Alkylsulfate | 3-10 |
| Succinoglycan | 0.1-4 |
| Xanthan Gum | 0.2-2 |

TABLE 6-continued

| Ingredient | Amount (wt. %) |
|---|---|
| Ethylene Glycol and/or Propylene Glycol | 1-10 |
| Butyl Carbitol | 1-10 |
| Monosaccharide sugar(s) | 5-25 |
| Total sugar/sugar alcohol component | 5-30 |

The illustrative aqueous firefighting foam formulations shown in Tables 1-6 typically have a pH of about 7 to 9. The formulations shown in Tables 1-6 may have a pH of about 7.5 to 8.5. If necessary, a pH-adjusting agent may be added to the composition to achieve the desired pH range.

The illustrative aqueous firefighting foam formulations shown in Tables 1-6 may have a viscosity of about 1,000 to 5,000 cps and, in some embodiments, may have a viscosity of about 1,000 to 2,500 cps (as determined at room temperature (75° F./24° C.) with a #4 spindle at 30 rpm).

Example 2

A number of illustrative aqueous firefighting foam concentrates were prepared. Their formulations are shown in Table 7 below. These formulations were tested for their ability to extinguish a hydrocarbon fire and prevent ensuing burnback using the protocol of UL 162. The results shown below are the average of three test runs. The concentrates were diluted 3:97 with water to form solutions used in the burn tests.

TABLE 7

| Ingredient (Amount in wt. %) | 2-A | 2-B | 2-C | 2-D | 2-E | 2-F |
|---|---|---|---|---|---|---|
| Biocide | 0.1 | 0.1 | 0.1 | 0.1 | 0.1 | 0.1 |
| Corrosion Inhibitor | 0.05 | 0.05 | 0.05 | 0.05 | 0.05 | 0.05 |
| Cocamidopropyl Hydroxysultaine | 3.4 | 3.6 | 3.4 | 3.4 | 4 | 4 |
| Fatty alcohol monoethoxylate | — | — | 1 | 1 | — | — |
| Lauryl alcohol | 0.5 | 1 | — | — | — | — |
| Octyl alcohol | 0.5 | — | — | — | — | — |
| TEA Lauryl sulfate | 3.2 | 3.1 | 3.2 | 3.2 | 3.2 | 3.2 |
| Na Decyl sulfate | — | 1.5 | — | 1.6 | 1.4 | — |
| Na Ethylhexyl sulfate | — | — | 3.2 | — | — | 1.4 |
| Na Octyl sulfate | 3.4 | 1.6 | 1.7 | 1.7 | 3.3 | 3.3 |
| Diutan Gum | 0.75 | 0.25 | 0.75 | 0.75 | — | — |
| Welan Gum | — | — | — | — | 2 | 2.25 |
| Xanthan Gum | 0.75 | 0.75 | 0.75 | 0.75 | 0.5 | 0.25 |
| Fructose | — | — | 4 | — | — | — |
| Sucrose | — | 4 | — | — | — | — |
| Corn Syrup | 14.2 | 9.2 | 9.2 | 14.2 | 18 | 18 |
| Total Sugar Component | 14.2 | 13.2 | 13.2 | 14.2 | 18 | 18 |
| Ethylene Glycol | 5 | 4 | 2 | 2 | — | — |
| Propylene glycol | — | — | — | — | 2 | 2 |
| Butyl Carbitol | 2.5 | 4 | 2 | 2 | 5 | 5 |
| Magnesium sulfate | 1.5 | 1.5 | 1.5 | 1.5 | 1.25 | 1.25 |
| Water | ~67 | ~65 | ~69 | ~68 | ~59 | ~59 |
| UL 162 Heptane Extinguish | 1:28 min | — | — | 1:34 min | — | — |
| UL 162 Burnback/Self Extinguish | 0:18 min | — | — | 0:46 min | — | — |

Example 3

Table 8 shows an illustrative composition for an aqueous firefighting foam that includes a reducing agent. The amounts shown in these tables represent the weight percentage of the particular component based on the total weight of the composition. The formulations include a) a surfactant mixture including a nonionic surfactant, an anionic surfactant, and a zwitterionic surfactant, b) a siloxane-based surfactant, c) organic solvent comprising one or more of an alkylene glycol, glycerol and a glycol ether, d) at least about 60 wt. % water; e) a polysaccharide thickener; and g) a reducing agent.

TABLE 3

| Ingredient | Amount (wt. %) |
|---|---|
| Biocide | 0-0.2 |
| Corrosion inhibitor | 0-0.1 |
| Water | 30-80 |
| Zwitterionic surfactant | 1-15 |
| $C_{8-14}$-Fatty alcohol | 0-5 |
| $C_{8-14}$-Alkyl sulfate surfactant | 2-15 |
| Polysaccharide gum | 0.5-5 |
| Alkylene glycol | 1-15 |
| Alkyl carbitol | 1-15 |
| Total Organic Solvent | 1-20 |
| Monosaccharide sugar(s) | 5-25 |
| Reducing agent | 0.01-5 |
| Total sugar/sugar alcohol component | 5-30 |

Method of Producing a Firefighting Foam

The firefighting foam concentrates described herein may be mixed with a diluent to form firefighting foam precursor solution, i.e., a use strength composition. The firefighting foam precursor solution may be aerated (e.g., using a nozzle) to produce a firefighting foam including the firefighting foam concentrate and the diluent. Illustrative diluents may include water, such as fresh water, brackish water, sea water, and combinations thereof. In some embodiments, the firefighting foam compositions described above may be 1 vol. %, 3 vol. %, or 5 vol. % concentrate solutions, meaning that the firefighting foam compositions are mixed with 99 vol. %, 97 vol. %, or 95 vol. % diluent, respectively, to form the firefighting foam precursor solution.

In some instances, it has been found that the order of addition of ingredients with appropriate agitation may impact the actual firefighting performance as seen in the UL and EN fire tests. It may be suitable to begin by mixing the sugar component with a substantial amount of water and subsequently preparing a solution or slurry of the polysaccharide thickener in the aqueous sugar solution prior to blending in the remaining components of the foam concentrate. It was found that first preparing an aqueous sugar solution by combining and mixing the sugars (e.g., glucose, fructose, and/or sorbitol) with water may facilitate later dissolution and/or dispersal of the biogums/biopolymers (e.g., xanthan gum). This can allow the gums to properly hydrate without encapsulating (clumping) upon the addition of the surfactant(s), other optional compounds and remaining amounts of water. Surfactants and other optional additives can then be added and the resulting mixture may finally be diluted further with water to decrease the viscosity of the preparation, if desired.

Firefighting foams that were prepared not following this order of component addition may result in polysaccharide bio gums that are encapsulated, but not fully hydrated, which can result in the production of foams that are not satisfactory for fire testing. Thus, in some embodiments, the initial formation of an aqueous sugar solution is important in process order and can be used to dissolve/disperse polysaccharide thickener(s) into the foam concentrate before addition of any other ingredients, such as surfactant(s) and/or other additives.

Method of Fighting a Fire

The firefighting foam compositions described herein may be used to fight a fire and/or to suppress flammable vapors by mixing the firefighting foam compositions with a diluent, aerating the resulting firefighting foam precursor solution to form a firefighting foam, and administering the firefighting foam to a fire or applying the firefighting foam to the surface of a volatile flammable liquid (e.g., gasoline or other flammable hydrocarbon or a flammable polar solvent).

ILLUSTRATIVE EMBODIMENTS

Reference is made to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials, and compositions described herein.

In an illustrative embodiment, the aqueous firefighting foam concentrate includes about 5 to 40 wt. % of a sugar component, which comprises at least about 50 wt. % monosaccharide sugar and/or sugar alcohol; about 2 to 20 wt. % anionic surfactant, which comprises one or more of an aliphatic sulfate salt, aliphatic sulfonate salt, an aliphatic ether sulfate salt, and aliphatic ether sulfate salt; about 1 to 10 wt. % zwitterionic surfactant, which comprises one or more of an alkylamidoalkyl betaine, an alkyl sulfobetaine, an alkylamidoalkyl hydroxysultaine and an alkyl hydroxysultaine; about 0.2 to 5 wt. % of an aliphatic alcohol; about 0.1 to 5 wt. % polysaccharide thickener; about 1 to 20 wt. % organic solvent, which comprises one or more of a glycol, glycol ether, glycerol and/or water-soluble polyethylene glycol (PEG); and at least about 30 wt. % water. The concentrate generally contains no more than 0.01 wt. % of a fluorinated compound.

In another illustrative embodiment, the aqueous firefighting foam concentrate includes about 5 to 40 wt. % of a sugar component, which comprises at least about 50 wt. % monosaccharide sugar and/or sugar alcohol; about 2 to 20 wt. % anionic surfactant, which comprises one or more of an aliphatic sulfate salt, aliphatic sulfonate salt, an aliphatic ether sulfate salt, and aliphatic ether sulfate salt; about 1 to 10 wt. % zwitterionic surfactant, which comprises one or more of an alkylamidoalkyl betaine, an alkyl sulfobetaine, an alkylamidoalkyl hydroxysultaine and an alkyl hydroxysultaine; about 0.2 to 5 wt. % of an aliphatic alcohol ethoxylate; about 0.1 to 5 wt. % polysaccharide thickener; about 1 to 20 wt. % organic solvent, which comprises one or more of a glycol, glycol ether, glycerol and/or water-soluble polyethylene glycol (PEG); and at least about 30 wt. % water.

In another illustrative embodiment, the aqueous firefighting foam concentrate includes about 5 to 25 wt. % of a sugar component; about 0.1 to 5 wt. % of an aliphatic alcohol-based nonionic surfactant; about 2 to 10 wt. % of an anionic surfactant; about 1 to 8 wt. % of a zwitterionic surfactant; about 2 to 15 wt. % water-miscible organic solvent; and at least about 50 wt. % water. Such a concentrate commonly contains no more than 0.01 wt. % fluorinated surfactants.

In another illustrative embodiment, the aqueous firefighting foam concentrate includes at least about 10 wt. % of a sugar component, which comprises at least about 50 wt. % monosaccharide sugar and/or sugar alcohol; about 2-20 wt. % of a surfactant mixture comprising one or more of an aliphatic alcohol surfactant, an alkyl sulfate and/or alkyl sulfonate anionic surfactant, and a zwitterionic surfactant; about 2-20 wt. % of a water-miscible solvent, which includes one or more of an alkylene glycol, glycerol and a glycol ether; a polysaccharide thickener; and at least about 50 wt. % water.

In another illustrative embodiment, the aqueous firefighting foam concentrate includes about 5 to 20 wt. % monosaccharide sugar; about 3 to 10 wt. % $C_{8-14}$-alkyl sulfate anionic surfactant; about 2 to 5 wt. % alkylamidopropyl hydroxysultaine; about 0.2 to 1.5 wt. % diutan gum; about 0.2 to 1.5 wt. % xanthan gum; about 1 to 5 wt. % ethylene glycol; about 1 to 5 wt. % butyl carbitol; and at least about 50 wt. % water. Such concentrates commonly contain no more than 0.01 wt. % fluorinated surfactants.

In another illustrative embodiment, the aqueous firefighting foam concentrate includes at least about 10 wt. % of a sugar component, which comprises at least about 50 wt. % monosaccharide sugar and/or sugar alcohol; about 2-20 wt. % a surfactant mixture comprising one or more of an aliphatic alcohol ethoxylate surfactant, an alkyl sulfate and/or alkyl sulfonate anionic surfactant, and a zwitterionic surfactant; about 2-20 wt. % water-miscible solvent comprising one or more of an alkylene glycol, glycerol and a glycol ether; a polysaccharide thickener; and at least about 50 wt. % water.

In another illustrative embodiment, the aqueous firefighting foam concentrate includes about 5 to 20 wt. % monosaccharide sugar; about 3 to 15 wt. % $C_{8-14}$-alkyl sulfate anionic surfactant; about 2 to 7 wt. % alkylamidopropyl hydroxysultaine; about 0.2 to 3 wt. % diutan gum; about 0.2 to 1.5 wt. % xanthan gum; about 1 to 5 wt. % ethylene glycol and/or propylene glycol; about 1 to 5 wt. % butyl carbitol; and at least about 50 wt. % water. Such concentrates commonly contain no more than 0.01 wt. % fluorinated surfactants.

In another illustrative embodiment, the aqueous firefighting foam concentrate includes about 5 to 20 wt. % monosaccharide sugar; about 3 to 15 wt. % $C_{8-14}$-alkyl sulfate anionic surfactant; about 2 to 7 wt. % alkylamidopropyl hydroxysultaine; about 0.2 to 4 wt. % welan gum; about 0.2 to 1.5 wt. % xanthan gum; about 1 to 5 wt. % ethylene glycol and/or propylene glycol; about 1 to 5 wt. % butyl carbitol;

and at least about 50 wt. % water. Such concentrates commonly contain no more than 0.01 wt. % fluorinated surfactants.

In another illustrative embodiment, the aqueous firefighting foam concentrate includes about 5 to 20 wt. % monosaccharide sugar; about 3 to 15 wt. % $C_{8-14}$-alkyl sulfate anionic surfactant; about 2 to 7 wt. % alkylamidopropyl hydroxysultaine; about 0.2 to 4 wt. % succinoglycan; about 0.2 to 1.5 wt. % xanthan gum; about 1 to 5 wt. % ethylene glycol and/or propylene glycol; about 1 to 5 wt. % butyl carbitol; and at least about 50 wt. % water. Such concentrates commonly contain no more than 0.01 wt. % fluorinated surfactants.

In another embodiment, the concentrate includes: about 1-4 wt. % polysaccharide thickener, which comprises xanthan gum and/or diutan gum; about 5-15 wt. % $C_{8-14}$-alkyl sulfate anionic surfactant; about 2-10 wt. % $C_{8-18}$-alkylamidopropyl hydroxysultaine surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; propylene glycol and butyl carbitol; and at least about 50 wt. % water; wherein the concentrate contains no more than 0.01 wt. % fluorinated surfactants.

In another embodiment, the concentrate includes: about 1-4 wt. % polysaccharide thickener, which comprises xanthan gum and/or welan gum; about 5-15 wt. % $C_{8-14}$-alkyl sulfate anionic surfactant; about 2-10 wt. % $C_{8-18}$-alkylamidopropyl hydroxysultaine surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; propylene glycol and butyl carbitol; and at least about 50 wt. % water; wherein the concentrate contains no more than 0.01 wt. % fluorinated surfactants.

In another embodiment, the concentrate includes: about 1-4 wt. % polysaccharide thickener, which comprises xanthan gum and/or succinoglycan; about 5-15 wt. % $C_{8-14}$-alkyl sulfate anionic surfactant; about 2-10 wt. % $C_{8-18}$-alkylamidopropyl hydroxysultaine surfactant; about 0.5-5 wt. % of an aliphatic alcohol-based component, which comprises at least two compounds selected from capryl alcohol, lauryl alcohol, a lauryl alcohol ethoxylate having an average of about 1 to 4 ethylene oxide units; propylene glycol and butyl carbitol; and at least about 50 wt. % water; wherein the concentrate contains no more than 0.01 wt. % fluorinated surfactants.

Any of the illustrative foam concentrates described above may also include one or more of a chelator, a buffer, a corrosion inhibitor and a preservative. Such concentrates may have a pH of about 7 to 9.

Para. 1. An aqueous fire-fighting foam concentrate comprising: a sugar component comprising a monosaccharide sugar, a sugar alcohol, or a combination thereof; a polysaccharide thickener; a surfactant component comprising an anionic surfactant, a zwitterionic surfactant, and an aliphatic alcohol-based nonionic surfactant; a water-miscible organic solvent; and at least about 30 wt. % water.

Para. 2. An aqueous fire-fighting foam concentrate comprising: at least about 10 wt. % of a sugar component comprising at least about 50 wt. % of glucose, fructose, or a combination thereof; a polysaccharide thickener; a surfactant component comprising an anionic surfactant, a zwitterionic surfactant, and an aliphatic alcohol-based nonionic surfactant; an organic solvent comprising one or more of a glycol, a glycol ether, a glycerol, and a water-soluble polyethylene glycol (PEG); and at least about 30 wt. % water.

Para. 3. An aqueous fire-fighting foam concentrate comprising: a sugar component, which comprises monosaccharide sugar and/or sugar alcohol; a polysaccharide thickener; an aliphatic alcohol-based nonionic surfactant; a second surfactant component comprising an anionic surfactant, a zwitterionic surfactant, or a mixture thereof; a water-miscible organic solvent; and at least about 30 wt. % water.

Para. 4. An aqueous fire-fighting foam concentrate comprising: about 5 to 40 wt. % of a sugar component comprising at least about 50 wt. % monosaccharide sugar, sugar alcohol, or a mixure thereof; about 2 to 20 wt. % of an anionic surfactant comprising one or more of an aliphatic sulfate salt, aliphatic sulfonate salt, an aliphatic ether sulfate salt, and aliphatic ether sulfate salt; about 1 to 10 wt. % of a zwitterionic surfactant comprising one or more of an alkylamidoalkyl betaine, an alkyl sulfobetaine, an alkylamidoalkyl hydroxysultaine, and an alkyl hydroxysultaine; about 0.2 to 5 wt. % of an aliphatic alcohol; about 0.1 to 5 wt. % of a polysaccharide thickener; about 1 to 20 wt. % of an organic solvent comprising one or more of a glycol, a glycol ether, a glycerol, and a water-soluble polyethylene glycol (PEG); and at least about 30 wt. % water.

Para. 5. An aqueous fire-fighting foam concentrate comprising: about 5 to 40 wt. % of a sugar component comprising at least about 50 wt. % of a monosaccharide sugar, a sugar alcohol, or a mixture thereof; about 2 to 20 wt. % of a anionic surfactant comprising one or more of an aliphatic sulfate salt, an aliphatic sulfonate salt, an aliphatic ether sulfate salt, and an aliphatic ether sulfate salt; about 1 to 10 wt. % of a zwitterionic surfactant comprising one or more of an alkylamidoalkyl betaine, an alkyl sulfobetaine, an alkylamidoalkyl hydroxysultaine, and an alkyl hydroxysultaine; about 0.2 to 5 wt. % of an aliphatic alcohol ethoxylate; about 0.1 to 5 wt. % of a polysaccharide thickener; and about 1 to 20 wt. % of an organic solvent comprising one or more of a glycol, glycol ether, glycerol, and a water-soluble polyethylene glycol (PEG); and at least about 30 wt. % water; and wherein the concentrate contains no more than 0.01 wt. % fluorinated surfactants.

Para. 6. The aqueous fire-fighting foam concentrate of any of Paras. 1 to 5, wherein the sugar component comprises at least about 50 wt. % of one or more monosaccharide sugars.

Para. 7. The aqueous fire-fighting foam concentrate of any of paras. 1, 3, 4, or 5, wherein the sugar component comprises glucose, fructose, mannose, xylose, xylitol, sorbitol, mannitol, or a combination of any two or more thereof.

Para. 8. The aqueous fire-fighting foam concentrate of any of paras. 1 to 5, wherein the sugar component comprises at least about 75 wt. % of a monosaccharide sugar, a sugar alcohol, or a mixture thereof.

Para. 9. The aqueous fire-fighting foam concentrate of any of paras. 1, 3, 4, or 5, wherein the sugar component comprises at least about 50 wt. % of glucose, fructose, mannose, xylose, sorbitol, mannitol, or a combination of any two or more thereof.

Para. 10. The aqueous fire-fighting foam concentrate of any of paras. 1, 3, 4, or 5, wherein the sugar component comprises at least about 50 wt. % of one or more sugar alcohols.

Para. 11. The aqueous fire-fighting foam concentrate of any of paras. 1 to 10, wherein the concentrate comprises about 5 to 25 wt. % of the sugar component, or about 10 to 20 wt. % of the sugar component.

Para. 12. The aqueous fire-fighting foam concentrate of any of paras. 1 to 11, wherein the organic solvent comprises an alkylene glycol, a glycerol, a water-soluble polyethylene glycol, a glycol ether, or a mixture of any two or more thereof.

Para. 13. The aqueous fire-fighting foam concentrate of any of paras. 1 to 11, wherein the organic solvent comprises ethylene glycol, propylene glycol, and an alkyl carbitol.

Para. 14. The aqueous fire-fighting foam concentrate of any of paras. 1 to 11, wherein the organic solvent comprises propylene glycol and butyl carbitol.

Para. 15. The aqueous fire-fighting foam concentrate of any of paras. 1 to 11, wherein the organic solvent comprises ethylene glycol and butyl carbitol.

Para. 16. The aqueous fire-fighting foam concentrate of any of paras. 1 to 15, wherein the concentrate comprises about 1 to 15 wt. % of the organic solvent, or about 2 to 10 wt. % of the organic solvent.

Para. 17. The aqueous fire-fighting foam concentrate of any of paras. 1 to 16, wherein the aliphatic alcohol-based nonionic surfactant is an aliphatic alcohol, an aliphatic alcohol ethoxylate, or a mixture of any two or more thereof.

Para. 18. The aqueous fire-fighting foam concentrate of any of paras. 1 to 16, wherein the aliphatic alcohol-based nonionic surfactant comprises an aliphatic alcohol having 8 to 14 carbon atoms, an aliphatic alcohol ethoxylate having 10 to 16 carbon atoms in its alcohol portion, or a mixture of any two or more thereof.

Para. 19. The aqueous fire-fighting foam concentrate of any of paras. 17 to 18, wherein the aliphatic alcohol-based nonionic surfactant comprises an aliphatic alcohol having 8 to 14 carbon atoms.

Para. 20. The aqueous fire-fighting foam concentrate of any of paras. 17 to 19, wherein the aliphatic alcohol comprises a linear $C_8$-$C_{14}$ aliphatic alcohol.

Para. 21. The aqueous fire-fighting foam concentrate of any of paras. 17 to 20, wherein the aliphatic alcohol comprises octyl alcohol, decyl alcohol, lauryl alcohol, myristyl alcohol, or a mixture of any two or more thereof.

Para. 22. The aqueous fire-fighting foam concentrate of any of paras. 1 to 16, wherein the aliphatic alcohol-based nonionic surfactant comprises an aliphatic alcohol ethoxylate having an average of no more than about 2 ethylene oxide units and an aliphatic alcohol portion having 10 to 16 carbon atoms.

Para. 23. The aqueous fire-fighting foam concentrate of any of paras. 17 to 22, wherein the aliphatic alcohol ethoxylate is a lauryl alcohol ethoxylate, a myristyl alcohol ethoxylate, or a mixture of any two or more thereof.

Para. 24. The aqueous fire-fighting foam concentrate of any of paras. 17 to 22, wherein the aliphatic alcohol ethoxylate has an average of no more than about 1.2 ethylene oxide units.

Para. 25. The aqueous fire-fighting foam concentrate of any of paras. 17 to 22, wherein the aliphatic alcohol ethoxylate comprises an ethoxylate of a linear $C_{10}$-$C_{14}$ aliphatic alcohol having no more than about 1.2 ethylene oxide units.

Para. 26. The aqueous fire-fighting foam concentrate of any of paras. 1 to 25, wherein the concentrate comprises about 0.1 to 5 wt. % of the aliphatic alcohol-based nonionic surfactant, or about 0.5 to 2 wt. % of the aliphatic alcohol-based nonionic surfactant.

Para. 27. The aqueous fire-fighting foam concentrate of any of paras. 18 to 21, wherein the concentrate comprises about 0.1 to 5 wt. % of the aliphatic alcohol, or about 0.5 to 2 wt. % of the aliphatic alcohol.

Para. 28. The aqueous fire-fighting foam concentrate of any of paras. 22 to 25, wherein the concentrate comprises about 0.1 to 5 wt. % of the aliphatic alcohol ethoxylate, or about 0.5 to 2 wt. % of the aliphatic alcohol ethoxylate.

Para. 29. The aqueous fire-fighting foam concentrate of any of paras. 1 to 28, wherein the zwitterionic surfactant comprises an alkylamidoalkyl hydroxysultaine, an alkylamidoalkyl betaine, an alkyl sulfobetaine surfactant, an alkyl betaine surfactant, or a mixture of any two or more thereof.

Para. 30. The aqueous fire-fighting foam concentrate of any of paras. 1 to 28, wherein the zwitterionic surfactant comprises a $C_8$-$C_{18}$ alkylamidopropyl hydroxysultaine surfactant, a $C_8$-$C_{18}$ alkylamidopropyl betaine surfactant, a $C_8$-$C_{18}$ alkyl sulfobetaine surfactant, a $C_8$-$C_{18}$ alkyl betaine surfactant, or a mixture of any two or more thereof.

Para. 31. The aqueous fire-fighting foam concentrate of any of paras. 1 to 28, wherein the zwitterionic surfactant comprises an alkylamidopropyl hydroxysultaine.

Para. 32. The aqueous fire-fighting foam concentrate of any of paras. 1 to 28, wherein the zwitterionic surfactant comprises a $C_8$-$C_{14}$ alkylamidopropyl hydroxysultaine.

Para. 33. The aqueous fire-fighting foam concentrate of any of paras. 1 to 28, wherein the zwitterionic surfactant comprises cocamidopropyl hydroxysultaine.

Para. 34. The aqueous fire-fighting foam concentrate of any of paras. 1 to 28, wherein the zwitterionic surfactant comprises laurylamidopropyl hydroxysultaine and/or myristylamidopropyl hydroxysultaine.

Para. 35. The aqueous fire-fighting foam concentrate of any of paras. 1 to 34, wherein the concentrate comprises about 1 to 8 wt. % of the zwitterionic surfactant, or about 2 to 5 wt. % of the zwitterionic surfactant.

Para. 36. The aqueous fire-fighting foam concentrate of any of paras. 1 to 35, wherein the anionic surfactant comprises an alkyl sulfate salt, an alkyl sulfonate salt, an alkyl ether sulfate surfactant, an alkyl ether sulfonate surfactant, or a mixture of any two or more thereof.

Para. 37. The aqueous fire-fighting foam concentrate of any of paras. 1 to 35, wherein the anionic surfactant comprises an alkyl sulfate salt, an alkyl sulfonate salt, or a mixture of any two or more thereof.

Para. 38. The aqueous fire-fighting foam concentrate of any of paras. 1 to 35, wherein the anionic surfactant comprises a $C_5$-$C_{14}$-alkyl sulfate salt and/or a $C_5$-$C_{14}$-alkyl sulfonate salt.

Para. 39. The aqueous fire-fighting foam concentrate of any of paras. 1 to 35, wherein the anionic surfactant comprises one or more surfactants selected from $C_{12}$-$C_{18}$-alkyl sulfate salts, $C_{12}$-$C_{18}$-alkyl sulfonate salts.

Para. 40. The aqueous fire-fighting foam concentrate of any of paras. 1 to 35, wherein the anionic surfactant comprises an octyl sulfate salt, a decyl sulfate salt, a dodecyl sulfate salt, a tetradecyl sulfate salt, or a mixture of any two or more thereof.

Para. 41. The aqueous fire-fighting foam concentrate of any of paras. 1 to 35, wherein the anionic surfactant comprises one or more anionic surfactants selected from octyl sulfate salts, decyl sulfate salts lauryl sulfate salts.

Para. 42. The aqueous fire-fighting foam concentrate of any of paras. 1 to 41, wherein the concentrate comprises about 2 to 15 wt. % of the anionic surfactant, or about 3 to 10 wt. % of the anionic surfactant.

Para. 43. The aqueous fire-fighting foam concentrate of any of paras. 1 to 11, wherein the organic solvent comprises diethylene glycol n-butyl ether, dipropylene glycol n-propyl ether, hexylene glycol, ethylene glycol, dipropylene glycol, tripropylene glycol, dipropylene glycol monobutyl ether, dipropylene glycol monomethyl ether, ethylene glycol monobutyl ether, tripropylene glycol methyl ether, dipropylene glycol monopropyl ether, propylene glycol, glycerol, or a mixture of any two or more thereof.

Para. 44. The aqueous fire-fighting foam concentrate of any of paras. 1 to 43, wherein the polysaccharide thickener comprises agar, sodium alginate, carrageenan, gum arabic, gum guaicum, neem gum, pistacia lentiscus, gum chatti, caranna, galactomannan, gum tragacanth, karaya gum, guar gum, welan gum, rhamsam gum, locust bean gum, beta-glucan, cellulose, methylcellulose, chicle gum, kino gum, dammar gum, glucomannan, succinoglycan, mastic gum, spruce gum, tara gum, gellan gum, xanthan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, or a mixture of any two or more thereof.

Para. 45. The aqueous fire-fighting foam concentrate of any of paras. 1 to 43, wherein the polysaccharide thickener comprises xanthan gum, diutan gum, rhamsan gum, welan gum, gellan gum, guar gum, konjac gum, tara gum, succinoglycan, methylcellulose, or a mixture of any two or more thereof.

Para. 46. The aqueous fire-fighting foam concentrate of any of paras. 1 to 43, wherein the polysaccharide thickener comprises xanthan gum and one or more of diutan gum, rhamsan gum, welan gum, gellan Gum, guar gum, konjac gum, tara gum, succinoglycan, and methylcellulose.

Para. 47. The aqueous fire-fighting foam concentrate of any of paras. 1 to 43, wherein the polysaccharide thickener comprises xanthan gum and one or more of diutan gum, succinoglycan, welan gum and rhamsan gum.

Para. 48. The aqueous fire-fighting foam concentrate of any of paras. 1 to 43, wherein the polysaccharide thickener comprises welan gum.

Para. 49. The aqueous fire-fighting foam concentrate of any of paras. 1 to 43, wherein the polysaccharide thickener comprises succinoglycan.

Para. 50. The aqueous fire-fighting foam concentrate of any of paras. 1 to 49, wherein the concentrate includes about 0.1 to 5 wt. % of the polysaccharide thickener, or about 0.5 to 3 wt. % of the polysaccharide thickener.

Para. 51. The aqueous fire-fighting foam concentrate of any of paras. 1 to 50 further comprising a metallic salt comprising a multi-valent cation selected from the group consisting of aluminum, calcium, copper, iron, magnesium, potassium, and calcium cations.

Para. 52. The aqueous fire-fighting foam concentrate of any of paras. 1 to 50 further comprising magnesium sulfate.

Para. 53. The aqueous fire-fighting foam concentrate of any of paras. 1 to 50 further comprising a reducing agent.

Para. 54. The aqueous fire-fighting foam concentrate of para. 53, wherein the reducing agent comprises a sulfite salt.

Para. 55. The aqueous fire-fighting foam concentrate of para. 53 or 54, wherein the reducing agent comprises sodium sulfite, sodium metabisulfite, sodium bisulfite, or a mixture of any two or more thereof.

Para. 56. The aqueous fire-fighting foam concentrate of para. 1, comprising: about 5 to 25 wt. % of the sugar component; about 0.1 to 5 wt. % of the aliphatic alcohol-based nonionic surfactant; about 2 to 10 wt. % of the anionic surfactant; about 1 to 8 wt. % of the zwitterionic surfactant; about 2 to 15 wt. % of the water-miscible organic solvent; and at least about 50 wt. % water; wherein the composition contains no more than 0.01 wt. % fluorinated surfactants.

Para. 57. The aqueous fire-fighting foam concentrate of para. 1, comprising: about 5 to 20 wt. % of the monosaccharide sugar; about 3 to 15 wt. % of a $C_8$-$C_{14}$-alkyl sulfate anionic surfactant; about 2 to 7 wt. % of an alkylamidopropyl hydroxysultaine; about 0.2 to 3 wt. % of diutan gum; about 0.2 to 1.5 wt. % of xanthan gum; about 1 to 5 wt. % of ethylene glycol, propylene glycol, or a mixture thereof about 1 to 5 wt. % of butyl carbitol; and at least about 50 wt. % water; wherein the composition contains no more than 0.01 wt. % fluorinated surfactants.

Para. 58. The aqueous fire-fighting foam concentrate of para. 1, comprising: about 5 to 25 wt. % of the sugar component; about 0.1 to 5 wt. % of the aliphatic alcohol-based nonionic surfactant; about 2 to 10 wt. % of the anionic surfactant; about 1 to 8 wt. % of the zwitterionic surfactant; about 2 to 15 wt. % of the water-miscible organic solvent; about 0.01 to 5 wt % of a reducing agent; and at least about 50 wt. % water; wherein the composition contains no more than 0.01 wt. % fluorinated surfactants.

Para. 59. The aqueous fire-fighting foam concentrate of para. 1, comprising: about 5 to 20 wt. % of the monosaccharide sugar; about 3 to 15 wt. % of a $C_8$-$C_{14}$-alkyl sulfate anionic surfactant; about 2 to 7 wt. % of an alkylamidopropyl hydroxysultaine; about 0.2 to 3 wt. % of diutan gum; about 0.2 to 1.5 wt. % of xanthan gum; about 1 to 5 wt. % of ethylene glycol, propylene glycol, or a mixture thereof; about 1 to 5 wt. % of butyl carbitol; about 0.01 to 5 wt % of a reducing agent; and at least about 50 wt. % water; wherein the composition contains no more than 0.01 wt. % fluorinated surfactants.

Para. 60. An aqueous firefighting foam concentrate comprising: at least about 10 wt. % of a sugar component comprising at least about 50 wt. % of a monosaccharide sugar, a sugar alcohol, or a mixture of any two or more thereof; about 2-20 wt. % of a surfactant mixture comprising a zwitterionic surfactant and one or more of an aliphatic alcohol surfactant, an alkyl sulfate, and alkyl sulfonate anionic surfactant; about 2-20 wt. % water-miscible solvent comprising an alkylene glycol, a glycerol, a glycol ether, or a mixture of any two or more thereof; a polysaccharide thickener; and at least about 50 wt. % water.

Para. 61. An aqueous firefighting foam concentrate comprising: at least about 10 wt. % of a sugar component comprising at least about 50 wt. % of a monosaccharide sugar, a sugar alcohol, or a mixture of any two or more thereof; about 2-20 wt. % of a surfactant mixture comprising a zwitterionic surfactant and one or more of an aliphatic alcohol surfactant, an alkyl sulfate, and alkyl sulfonate anionic surfactant; about 2-20 wt. % water-miscible solvent comprising an alkylene glycol, a glycerol, a glycol ether, or a mixture of any two or more thereof; a polysaccharide thickener; a reducing agent; and at least about 50 wt. % water.

Para. 62. An aqueous firefighting foam concentrate comprising: at least about 10 wt. % of a sugar component comprising at least about 50 wt. % of a monosaccharide sugar, a sugar alcohol, or a mixture of any two or more thereof; about 2-20 wt. % of a surfactant mixture comprising a zwitterionic surfactant and one or more of an aliphatic alcohol ethoxylate surfactant, an alkyl sulfate, and alkyl sulfonate anionic surfactant; about 2-20 wt. % of a water-miscible solvent comprising an alkylene glycol, glycerol, a glycol ether, or a mixture of any two or more thereof; a polysaccharide thickener; and at least about 50 wt. % water.

Para. 63. An aqueous firefighting foam concentrate comprising: at least about 10 wt. % of a sugar component comprising at least about 50 wt. % of a monosaccharide sugar, a sugar alcohol, or a mixture of any two or more thereof; about 2-20 wt. % of a surfactant mixture comprising a zwitterionic surfactant and one or more of an aliphatic alcohol ethoxylate surfactant, an alkyl sulfate, and alkyl sulfonate anionic surfactant; about 2-20 wt. % of a water-miscible solvent comprising an alkylene glycol, glycerol, a glycol ether, or a mixture of any two or more thereof; a polysaccharide thickener; a reducing agent; and at least about 50 wt. % water.

Para. 64. The composition of para. 1, comprising: about 5 to 20 wt. % of the monosaccharide sugar; about 3 to 15 wt. % of a $C_8$-$C_{14}$-alkyl sulfate anionic surfactant; about 2 to 7 wt. % of a alkylamidopropyl hydroxysultaine; about 0.2 to 4 wt. % of welan gum; about 0.2 to 1.5 wt. % of xanthan gum; about 1 to 5 wt. % of ethylene glycol, propylene glycol, or a mixture thereof; about 1 to 5 wt. % of butyl carbitol; and at least about 50 wt. % water; wherein the composition contains no more than 0.01 wt. % fluorinated surfactants.

Para. 65. The composition of para. 1, comprising: about 5 to 20 wt. % of the monosaccharide sugar; about 3 to 15 wt. % of a $C_8$-$C_{14}$ alkyl sulfate anionic surfactant; about 2 to 7 wt. % of a alkylamidopropyl hydroxysultaine; about 0.2 to 4 wt. % succinoglycan; about 0.2 to 1.5 wt. % xanthan gum; about 1 to 5 wt. % of ethylene glycol, propylene glycol, or a mixture thereof; about 1 to 5 wt. % butyl carbitol; and at least about 50 wt. % water; wherein the composition contains no more than 0.01 wt. % fluorinated surfactants. Para. 2.

Para. 66. The composition of para. 1, comprising: about 5 to 20 wt. % of the monosaccharide sugar; about 3 to 15 wt. % of a $C_8$-$C_{14}$-alkyl sulfate anionic surfactant; about 2 to 7 wt. % of a alkylamidopropyl hydroxysultaine; about 0.2 to 4 wt. % of welan gum; about 0.2 to 1.5 wt. % of xanthan gum; about 1 to 5 wt. % of ethylene glycol, propylene glycol, or a mixture thereof; about 1 to 5 wt. % of butyl carbitol; about 0.01 to 5 wt. % sodium sulfite, sodium bisulfite, sodium metalbisulfite, or a mixture of any two or more thereof; and at least about 50 wt. % water; wherein the composition contains no more than 0.01 wt. % fluorinated surfactants.

Para. 67. The composition of para. 1, comprising: about 5 to 20 wt. % of the monosaccharide sugar; about 3 to 15 wt. % of a $C_8$-$C_{14}$ alkyl sulfate anionic surfactant; about 2 to 7 wt. % of a alkylamidopropyl hydroxysultaine; about 0.2 to 4 wt. % succinoglycan; about 0.2 to 1.5 wt. % xanthan gum; about 1 to 5 wt. % of ethylene glycol, propylene glycol, or a mixture thereof; about 1 to 5 wt. % of butyl carbitol; about 0.01 to 5 wt. % sodium sulfite, sodium bisulfite, sodium metalbisulfite, or a mixture of any two or more thereof; and at least about 50 wt. % water; wherein the composition contains no more than 0.01 wt. % fluorinated surfactants.

Para. 68. The aqueous fire-fighting foam concentrate of any of paras. 1 to 67 further comprising a chelator, a buffer, a corrosion inhibitor, a preservative, or a mixture of any two or more thereof.

Para. 69. The aqueous fire-fighting foam concentrate of any of paras. 1 to 68, wherein the concentrate a pH of about 7 to 9.

Para. 70. The aqueous fire-fighting foam concentrate of any of paras. 1 to 69, wherein the concentrate is substantially free of any fluorinated compounds.

Para. 71. The aqueous fire-fighting foam concentrate of any of paras. 1 to 69, wherein the concentrate has a total concentration of fluorine atoms on a weight percentage basis of no more than about 1 ppm fluorine.

Para. 72. A method of forming a firefighting foam, the method comprising: mixing the aqueous fire-fighting foam concentrate of any of paras. 1 to 71 with an aqueous diluent to form a foam precursor solution; and aerating the foam precursor solution to form the firefighting foam.

Para. 73. The method of para. 72, wherein the aqueous diluent is selected from the group consisting of fresh water, brackish water, sea water, and combinations thereof.

Para. 74. A firefighting foam comprising the firefighting foam concentrate of any of paras. 1 to 71 and a diluent.

Para. 75. A method of fighting a fire comprising administering the firefighting foam of para. 74 to the fire.

While certain embodiments have been illustrated and described, it should be understood that changes and modifications can be made therein in accordance with ordinary skill in the art without departing from the technology in its broader aspects.

The embodiments illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expression of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "and" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or illustrative language (e.g., "such as") provided herein, is intended merely to better illuminate the embodiments and does not pose a limitation on the scope of the claims unless otherwise stated. No language in the specification should be construed as indicating any non-claimed element as essential.

Additionally, where features or aspects of the disclosure are described in terms of Markush groups, those skilled in the art will realize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof

What is claimed is:

1. An aqueous fire-fighting foam concentrate comprising:

about greater than 10 wt. % to about 40 wt. % of a sugar component comprising a monosaccharide sugar, a sugar alcohol, or a combination thereof, a polysaccharide thickener;

a surfactant component comprising an anionic, surfactant and a zwitterionic surfactant;

a water-miscible organic solvent; and at least about 30 wt. % water;

wherein the concentrate is substantially free of nonionic surfactants.

2. The aqueous fire-fighting foam concentrate of claim 1 comprising:

about 5 to 40 wt. % of the sugar component comprising at least about 50 wt. % monosaccharide sugar, sugar alcohol, or a mixture of any two or more thereof;

about 2 to 20 wt. % of an anionic surfactant comprising one or more of an aliphatic sulfate salt, aliphatic sulfonate salt, an aliphatic ether sulfate salt, and aliphatic ether sulfate salt;

about 1 to 10 wt. % of a zwitterionic surfactant comprising one or more of an alkylamidoalkyl betaine, an alkyl sulfobetaine, an alkylamidoalkyl hydroxysultaine, and an alkyl hydroxysultaine;

about 0.1 to 5 wt. % of a polysaccharide thickener;

about 1 to 20 wt. % of an organic solvent comprising one or more of a glycol, a glycol ether, a glycerol, and a water-soluble polyethylene glycol (PEG); and at least about 30 wt. % water.

3. The aqueous fire-fighting foam concentrate of claim 2 further comprising about 0.2 to 5 wt. % of an aliphatic alcohol.

4. The aqueous fire-fighting foam concentrate of claim 1 comprising:

about 5 to 40 wt. % of the sugar component comprising at least about 50 wt. % of a monosaccharide sugar, a sugar alcohol, or a mixture thereof;

about 2 to 20 wt. % of the anionic surfactant comprising one or more of an aliphatic sulfate salt, an aliphatic sulfonate salt, an aliphatic ether sulfate salt, and an aliphatic ether sulfate salt;

about 1 to 10 wt. % of the zwitterionic surfactant comprising one or more of an alkylamidoalkyl betaine, an alkyl sulfobetaine, an alkylamidoalkyl hydroxysultaine, and an alkyl hydroxysultaine;

about 0.1 to 5 wt. % of the polysaccharide thickener; and about 1 to 20 wt. % of the water-miscible organic solvent comprising one or more of a glycol, glycol ether, glycerol, and a water-soluble polyethylene glycol (PEG); and at least about 30 wt. % water; and wherein the concentrate contains no more than 0.01 wt. % fluorinated surfactants.

5. The aqueous fire-fighting foam concentrate of claim 4 further comprising about 0.2 to 5 wt. % of an aliphatic alcohol ethoxylate.

6. The aqueous fire-fighting foam concentrate of claim 1, wherein the sugar component comprises glucose, fructose, mannose, xylose, xylitol, sorbitol, mannitol, or a combination of any two or more thereof.

7. The aqueous fire-fighting foam concentrate of claim 1, wherein the sugar component comprises at least about 75 wt. % of a monosaccharide sugar, a sugar alcohol, or a mixture thereof.

8. The aqueous fire-fighting foam concentrate of claim 1, wherein the organic solvent comprises an alkylene glycol, a glycerol, a water-soluble polyethylene glycol, a glycol ether, or a mixture of any two or more thereof.

9. The aqueous fire-fighting foam concentrate of claim 1, wherein the organic solvent comprises propylene glycol and butyl carbitol.

10. The aqueous fire-fighting foam concentrate of claim 1, wherein the zwitterionic surfactant comprises an alkylamidoalkyl hydroxysultaine, an alkylamidoalkyl betaine, an alkyl sulfobetaine surfactant, an alkyl betaine surfactant, or a mixture of any two or more thereof.

11. The aqueous fire-fighting foam concentrate of claim 1, wherein the zwitterionic surfactant comprises an alkylamidopropyl hydroxysultaine, cocamidopropyl hydroxysultaine, laurylamidopropyl hydroxysultaine, or myristylamidopropyl hydroxysultaine.

12. The aqueous fire-fighting foam concentrate of claim 1, wherein the anionic surfactant comprises an alkyl sulfate salt, an alkyl sulfonate salt, an alkyl ether sulfate surfactant, an alkyl ether sulfonate surfactant, or a mixture of any two or more thereof.

13. The aqueous fire-fighting foam concentrate of claim 1, wherein the polysaccharide thickener comprises agar, sodium alginate, carrageenan, gum arabic, gum guaicum, neem gum, pistacia lentiscus, gum chatti, caranna, galactomannan, gum tragacanth, karaya gum, guar gum, welan gum, rhamsam gum, locust bean gum, beta- glucan, cellulose, methylcellulose, chicle gum, kino gum, dammar gum, glucomannan, succinoglycan, mastic gum, spruce gum, tara gum, gellan gum, xanthan gum, acacia gum, cassia gum, diutan gum, fenugreek gum, ghatti gum, hydroxyethylcellulose, hydroxypropylmethylcellulose, karaya gum, konjac gum, pectin, propylene glycol alginate, or a mixture of any two or more thereof.

14. The aqueous fire-fighting foam concentrate of claim 1, wherein the polysaccharide thickener comprises xanthan gum, diutan gum, rhamsan gum, welan gum, gellan gum, guar gum, konjac gum, tara gum, succinoglycan, methylcellulose, or a mixture of any two or more thereof.

15. The aqueous fire-fighting foam concentrate of claim 1 further comprising a reducing agent.

16. The aqueous fire-fighting foam concentrate of claim 15, wherein the reducing agent comprises sodium sulfite, sodium metabisulfite, sodium bisulfite, or a mixture of any two or more thereof.

* * * * *